United States Patent
Ederer et al.

(10) Patent No.: US 11,890,810 B2
(45) Date of Patent: Feb. 6, 2024

(54) DEVICE AND METHOD FOR PRODUCING THREE-DIMENSIONAL SHAPED PARTS

(71) Applicant: VOXELJET AG, Friedberg (DE)

(72) Inventors: Ingo Ederer, Geltendorf (DE); Daniel Günther, Munich (DE)

(73) Assignee: VOXELJET AG, Friedberg (DE)

( * ) Notice: Subject to any disclaimer, the term of this patent is extended or adjusted under 35 U.S.C. 154(b) by 273 days.

(21) Appl. No.: 15/759,703

(22) PCT Filed: Sep. 13, 2016

(86) PCT No.: PCT/DE2016/000343
§ 371 (c)(1),
(2) Date: Mar. 13, 2018

(87) PCT Pub. No.: WO2017/045660
PCT Pub. Date: Mar. 23, 2017

(65) Prior Publication Data
US 2019/0047218 A1 Feb. 14, 2019

(30) Foreign Application Priority Data
Sep. 16, 2015 (DE) ...................... 10 2015 011 790.4

(51) Int. Cl.
*B23K 10/00* (2006.01)
*B29C 64/321* (2017.01)
(Continued)

(52) U.S. Cl.
CPC .......... *B29C 64/321* (2017.08); *B23K 10/027* (2013.01); *B29C 64/209* (2017.08);
(Continued)

(58) Field of Classification Search
CPC ... B29C 64/165; B29C 64/153; B29C 64/112; B29C 64/35; B29C 64/245; B29C 31/02;
(Continued)

(56) References Cited

U.S. PATENT DOCUMENTS 3,668,997 A 6/1972 Ratowsky
3,913,503 A 10/1975 Becker
(Continued)

FOREIGN PATENT DOCUMENTS

AU 720255 B2 5/2000
CN 101146666 A 3/2008
(Continued)

OTHER PUBLICATIONS

US 4,937,420 A, 06/1990, Deckard (withdrawn)
(Continued)

*Primary Examiner* — Erin B Saad
(74) *Attorney, Agent, or Firm* — The Dobrusin Law Firm, P.C.

(57) ABSTRACT

The invention relates to a device and a method for producing three-dimensional shaped parts by means of a layer construction method on a construction field in a construction space of a device, wherein materials are supplied to and discharged from the construction space. A supplying and discharging of all materials is carried out in a spatial direction of the device.

22 Claims, 8 Drawing Sheets

(51) Int. Cl.
*B23K 10/02* (2006.01)
*B29C 64/232* (2017.01)
*B29C 64/245* (2017.01)
*B29C 64/255* (2017.01)
*B29C 64/209* (2017.01)
*B29C 64/268* (2017.01)

(52) U.S. Cl.
CPC .......... *B29C 64/232* (2017.08); *B29C 64/245* (2017.08); *B29C 64/255* (2017.08); *B29C 64/268* (2017.08); *B29C 2791/002* (2013.01); *B29C 2791/009* (2013.01)

(58) Field of Classification Search
CPC ....... B29C 64/357; B29C 41/12; B29C 64/10; B29C 64/141; B29C 64/321; B29C 64/329; B29C 64/20; B29C 64/227; B29C 64/25; B29C 64/40; B29C 41/52; B29C 64/118; B29C 64/176; B29C 64/209; B29C 64/214; B29C 64/232; B29C 64/295; B29C 64/343; B29C 64/364; B29C 71/0009; B29C 41/003; B29C 41/02; B29C 41/36; B29C 64/135; B29C 64/188; B29C 67/0077; B29C 67/24; B29C 67/246; B29C 2037/90; B29C 2948/92076; B29C 2948/92409; B29C 2948/92571; B29C 2948/92904; B29C 31/006; B29C 31/044; B29C 33/3842; B29C 33/448; B29C 33/52; B29C 33/56; B29C 35/08; B29C 37/005; B29C 39/10; B29C 41/34; B29C 41/48; B29C 48/03; B29C 48/15; B29C 48/21; B29C 48/266; B29C 64/124; B29C 64/147; B29C 64/171; B29C 64/205; B29C 64/236; B29C 64/255; B29C 64/268; B29C 64/386; B29C 67/243; B29C 71/009; B33Y 10/00; B33Y 30/00; B33Y 70/00; B33Y 40/00; B33Y 80/00; B33Y 50/02
See application file for complete search history.

(56) References Cited

U.S. PATENT DOCUMENTS

| | | |
|---|---|---|
| 4,247,508 A | 1/1981 | Housholder |
| 4,575,330 A | 3/1986 | Hull |
| 4,591,402 A | 5/1986 | Evans et al. |
| 4,600,733 A | 7/1986 | Ohashi et al. |
| 4,665,492 A | 5/1987 | Masters |
| 4,669,634 A | 6/1987 | Leroux |
| 4,711,669 A | 12/1987 | Paul et al. |
| 4,752,352 A | 6/1988 | Feygin |
| 4,752,498 A | 6/1988 | Fudim |
| 4,863,538 A | 9/1989 | Deckard |
| 4,938,816 A | 7/1990 | Beaman et al. |
| 4,944,817 A | 7/1990 | Bourell et al. |
| 5,017,753 A | 5/1991 | Deckard |
| 5,031,120 A | 7/1991 | Pomerantz et al. |
| 5,047,182 A | 9/1991 | Sundback et al. |
| 5,053,090 A | 10/1991 | Beaman et al. |
| 5,059,266 A | 10/1991 | Yamane et al. |
| 5,120,476 A | 6/1992 | Scholz |
| 5,126,529 A | 6/1992 | Weiss et al. |
| 5,127,037 A | 6/1992 | Bynum |
| 5,132,143 A | 7/1992 | Deckard |
| 5,134,569 A | 7/1992 | Masters |
| 5,136,515 A | 8/1992 | Helinski |
| 5,140,937 A | 8/1992 | Yamane et al. |
| 5,147,587 A | 9/1992 | Marcus et al. |
| 5,149,548 A | 9/1992 | Yamane et al. |
| 5,155,324 A | 10/1992 | Deckard et al. |
| 5,156,697 A | 10/1992 | Bourell et al. |
| 5,182,170 A | 1/1993 | Marcus et al. |
| 5,204,055 A | 4/1993 | Sachs et al. |
| 5,216,616 A | 6/1993 | Masters |
| 5,229,209 A | 7/1993 | Gharapetian et al. |
| 5,248,456 A | 8/1993 | Evans, Jr. et al. |
| 5,252,264 A | 10/1993 | Forderhase et al. |
| 5,263,130 A | 11/1993 | Pomerantz et al. |
| 5,269,982 A | 12/1993 | Brotz |
| 5,284,695 A | 2/1994 | Barlow et al. |
| 5,296,062 A | 3/1994 | Bourell et al. |
| 5,324,617 A | 6/1994 | Majima et al. |
| 5,340,656 A | 8/1994 | Sachs et al. |
| 5,342,919 A | 8/1994 | Dickens, Jr. et al. |
| 5,352,405 A | 10/1994 | Beaman et al. |
| 5,382,308 A | 1/1995 | Bourell et al. |
| 5,387,380 A | 2/1995 | Cima et al. |
| 5,398,193 A | 3/1995 | deAngelis |
| 5,418,112 A | 5/1995 | Mirle et al. |
| 5,427,722 A | 6/1995 | Fouts et al. |
| 5,431,967 A | 7/1995 | Manthiram et al. |
| 5,433,261 A | 7/1995 | Hinton |
| 5,482,659 A | 1/1996 | Sauerhoefer |
| 5,490,962 A | 2/1996 | Cima et al. |
| 5,503,785 A | 4/1996 | Crump et al. |
| 5,506,607 A | 4/1996 | Sanders, Jr. et al. |
| 5,518,060 A | 5/1996 | Cleary et al. |
| 5,518,680 A | 5/1996 | Cima et al. |
| 5,555,176 A | 9/1996 | Menhennett et al. |
| 5,573,721 A | 11/1996 | Gillette |
| 5,589,222 A | 12/1996 | Thometzek et al. |
| 5,616,631 A | 4/1997 | Kiuchi et al. |
| 5,637,175 A | 6/1997 | Feygin et al. |
| 5,639,070 A | 6/1997 | Deckard |
| 5,639,402 A | 6/1997 | Barlow et al. |
| 5,647,931 A | 7/1997 | Retallick et al. |
| 5,658,412 A | 8/1997 | Retallick et al. |
| 5,665,401 A | 9/1997 | Serbin et al. |
| 5,717,599 A | 2/1998 | Menhennett et al. |
| 5,730,925 A | 3/1998 | Mattes et al. |
| 5,740,051 A | 4/1998 | Sanders, Jr. et al. |
| 5,747,105 A | 5/1998 | Haubert |
| 5,749,041 A | 5/1998 | Lakshminarayan et al. |
| 5,753,274 A | 5/1998 | Wilkening et al. |
| 5,824,250 A | 10/1998 | Whalen |
| 5,837,960 A | 11/1998 | Lewis et al. |
| 5,851,465 A | 12/1998 | Bredt |
| 5,884,688 A | 3/1999 | Hinton et al. |
| 5,902,441 A | 5/1999 | Bredt et al. |
| 5,902,537 A | 5/1999 | Almquist et al. |
| 5,904,889 A | 5/1999 | Serbin et al. |
| 5,934,343 A | 8/1999 | Gaylo et al. |
| 5,940,674 A | 8/1999 | Sachs et al. |
| 5,943,235 A | 8/1999 | Earl et al. |
| 5,989,476 A | 11/1999 | Lockard et al. |
| 5,997,795 A | 12/1999 | Danforth |
| 6,007,318 A | 12/1999 | Russell et al. |
| 6,042,774 A | 3/2000 | Wilkening et al. |
| 6,048,188 A | 4/2000 | Hull et al. |
| 6,048,954 A | 4/2000 | Barlow et al. |
| 6,133,353 A | 10/2000 | Bui et al. |
| 6,146,567 A | 11/2000 | Sachs et al. |
| 6,147,138 A | 11/2000 | Hochsmann et al. |
| 6,155,331 A | 12/2000 | Langer et al. |
| 6,164,850 A | 12/2000 | Speakman |
| 6,165,406 A | 12/2000 | Jang et al. |
| 6,169,605 B1 | 1/2001 | Penn et al. |
| 6,193,922 B1 | 2/2001 | Ederer |
| 6,210,625 B1 | 4/2001 | Matsushita |
| 6,216,508 B1 | 4/2001 | Matsubara et al. |
| 6,217,816 B1 | 4/2001 | Tang |
| 6,243,616 B1 | 6/2001 | Droscher et al. |
| 6,259,962 B1 | 7/2001 | Gothait |
| 6,270,335 B2 | 8/2001 | Leyden et al. |
| 6,305,769 B1 | 10/2001 | Thayer et al. |
| 6,316,060 B1 | 11/2001 | Elvidge et al. |
| 6,318,418 B1 | 11/2001 | Grossmann et al. |
| 6,335,052 B1 | 1/2002 | Suzuki et al. |
| 6,335,097 B1 | 1/2002 | Otsuka et al. |
| 6,350,495 B1 | 2/2002 | Schriener et al. |

(56) References Cited

U.S. PATENT DOCUMENTS

| | | |
|---|---|---|
| 6,355,196 B1 | 3/2002 | Kotnis et al. |
| 6,375,874 B1 | 4/2002 | Russell et al. |
| 6,395,811 B1 | 5/2002 | Nguyen et al. |
| 6,401,001 B1 | 6/2002 | Jang et al. |
| 6,403,002 B1 | 6/2002 | Van Der Geest |
| 6,405,095 B1 | 6/2002 | Jang et al. |
| 6,423,255 B1 | 7/2002 | Hoechsmann et al. |
| 6,460,979 B1 | 10/2002 | Heinzl et al. |
| 6,476,122 B1 | 11/2002 | Leyden |
| 6,485,831 B1 | 11/2002 | Fukushima et al. |
| 6,500,378 B1 | 12/2002 | Smith |
| 6,554,600 B1 | 4/2003 | Hofmann et al. |
| 6,596,224 B1 | 7/2003 | Sachs et al. |
| 6,616,030 B2 | 9/2003 | Miller |
| 6,649,121 B1 | 11/2003 | Hamamoto |
| 6,658,314 B1 | 12/2003 | Gothait |
| 6,672,343 B1 | 1/2004 | Perret et al. |
| 6,713,125 B1 | 3/2004 | Sherwood et al. |
| 6,722,872 B1 | 4/2004 | Swanson et al. |
| 6,733,528 B2 | 5/2004 | Abe et al. |
| 6,742,456 B1 | 6/2004 | Kasperchik et al. |
| 6,827,988 B2 | 12/2004 | Krause et al. |
| 6,830,643 B1 | 12/2004 | Hayes |
| 6,838,035 B1 | 1/2005 | Ederer et al. |
| 6,896,839 B2 | 5/2005 | Kubo et al. |
| 6,905,645 B2 | 6/2005 | Iskra |
| 6,972,115 B1 | 12/2005 | Ballard |
| 7,087,109 B2 | 8/2006 | Bredt et al. |
| 7,120,512 B2 | 10/2006 | Kramer et al. |
| 7,153,463 B2 | 12/2006 | Leuterer et al. |
| 7,291,002 B2 | 11/2007 | Russell et al. |
| 7,296,990 B2 | 11/2007 | Devos et al. |
| 7,332,537 B2 | 2/2008 | Bredt et al. |
| 7,348,075 B2 | 3/2008 | Farr et al. |
| 7,378,052 B2 | 5/2008 | Harryson |
| 7,387,359 B2 | 6/2008 | Hernandez et al. |
| 7,455,805 B2 | 11/2008 | Oriakhi et al. |
| 7,497,977 B2 | 3/2009 | Nielsen et al. |
| 7,578,958 B2 | 8/2009 | Patel et al. |
| 7,597,835 B2 | 10/2009 | Marsac |
| 7,641,461 B2 | 1/2010 | Khoshnevis |
| 7,790,096 B2 | 9/2010 | Merot et al. |
| 7,799,253 B2 | 9/2010 | Höschmann et al. |
| 7,887,264 B2 | 2/2011 | Naunheimer et al. |
| 8,186,415 B2 | 5/2012 | Marutani et al. |
| 8,574,485 B2 | 11/2013 | Kramer |
| 8,741,194 B1* | 6/2014 | Ederer .................... B22C 23/00 |
| | | 264/113 |
| 8,951,033 B2 | 2/2015 | Höchsmann et al. |
| 9,327,450 B2 | 5/2016 | Hein et al. |
| 2001/0045678 A1 | 11/2001 | Kubo et al. |
| 2001/0050031 A1 | 12/2001 | Bredt et al. |
| 2002/0015783 A1 | 2/2002 | Harvey |
| 2002/0016387 A1 | 2/2002 | Shen |
| 2002/0026982 A1 | 3/2002 | Bredt et al. |
| 2002/0079601 A1 | 6/2002 | Russell et al. |
| 2002/0090410 A1 | 7/2002 | Tochimoto et al. |
| 2002/0111707 A1 | 8/2002 | Li et al. |
| 2002/0155254 A1 | 10/2002 | McQuate et al. |
| 2002/0167100 A1 | 11/2002 | Moszner et al. |
| 2002/0182351 A1 | 12/2002 | Akiyama |
| 2003/0004599 A1 | 1/2003 | Herbak |
| 2003/0065400 A1 | 4/2003 | Beam et al. |
| 2003/0083771 A1 | 5/2003 | Schmidt |
| 2003/0113729 A1 | 6/2003 | DaQuino et al. |
| 2003/0114936 A1 | 6/2003 | Sherwood et al. |
| 2004/0003738 A1 | 1/2004 | Imiolek et al. |
| 2004/0012112 A1 | 1/2004 | Davidson et al. |
| 2004/0025905 A1 | 2/2004 | Ederer et al. |
| 2004/0026418 A1 | 2/2004 | Ederer et al. |
| 2004/0035542 A1 | 2/2004 | Ederer et al. |
| 2004/0036200 A1 | 2/2004 | Patel et al. |
| 2004/0038009 A1 | 2/2004 | Leyden et al. |
| 2004/0045941 A1 | 3/2004 | Herzog et al. |
| 2004/0056378 A1 | 3/2004 | Bredt et al. |
| 2004/0084814 A1 | 5/2004 | Boyd et al. |
| 2004/0094058 A1 | 5/2004 | Kasperchik et al. |
| 2004/0112523 A1 | 6/2004 | Crom |
| 2004/0145088 A1 | 7/2004 | Patel et al. |
| 2004/0170765 A1 | 9/2004 | Ederer et al. |
| 2004/0187714 A1 | 9/2004 | Napadensky et al. |
| 2004/0207123 A1 | 10/2004 | Patel et al. |
| 2004/0239009 A1 | 12/2004 | Collins et al. |
| 2005/0003189 A1 | 1/2005 | Bredt et al. |
| 2005/0017386 A1 | 1/2005 | Harrysson |
| 2005/0017394 A1 | 1/2005 | Hochsmann et al. |
| 2005/0046067 A1 | 3/2005 | Oriakhi |
| 2005/0074511 A1 | 4/2005 | Oriakhi et al. |
| 2005/0079086 A1 | 4/2005 | Farr |
| 2005/0093194 A1 | 5/2005 | Oriakhi et al. |
| 2005/0167872 A1 | 8/2005 | Tsubaki et al. |
| 2005/0174407 A1 | 8/2005 | Johnson et al. |
| 2005/0179167 A1 | 8/2005 | Hachikian |
| 2005/0186538 A1* | 8/2005 | Uckelmann ............. B22F 10/20 |
| | | 433/201.1 |
| 2005/0212163 A1 | 9/2005 | Bausinger et al. |
| 2005/0218549 A1 | 10/2005 | Farr et al. |
| 2005/0219942 A1 | 10/2005 | Wallgren |
| 2005/0276976 A1 | 12/2005 | Pfeifer et al. |
| 2005/0280185 A1 | 12/2005 | Russell et al. |
| 2005/0283136 A1 | 12/2005 | Skarda |
| 2006/0012058 A1 | 1/2006 | Hasei |
| 2006/0103054 A1 | 5/2006 | Pfeifer et al. |
| 2006/0105102 A1 | 5/2006 | Hochsmann et al. |
| 2006/0159896 A1 | 7/2006 | Pfeifer et al. |
| 2006/0175346 A1 | 8/2006 | Ederer et al. |
| 2006/0208388 A1 | 9/2006 | Bredt et al. |
| 2006/0237159 A1 | 10/2006 | Hochsmann |
| 2006/0251535 A1 | 11/2006 | Pfeifer et al. |
| 2006/0254467 A1 | 11/2006 | Farr et al. |
| 2006/0257579 A1 | 11/2006 | Farr et al. |
| 2007/0026099 A1* | 2/2007 | Hagiwara ............... B22F 10/20 |
| | | 425/174.4 |
| 2007/0045891 A1 | 3/2007 | Martinoni |
| 2007/0054143 A1 | 3/2007 | Otoshi |
| 2007/0057412 A1* | 3/2007 | Weiskopf ............... B33Y 10/00 |
| | | 264/497 |
| 2007/0065397 A1 | 3/2007 | Ito et al. |
| 2007/0087071 A1* | 4/2007 | Devos .................... B29C 64/165 |
| | | 425/375 |
| 2007/0126157 A1 | 6/2007 | Bredt |
| 2007/0215020 A1 | 9/2007 | Miller |
| 2007/0238056 A1 | 10/2007 | Baumann et al. |
| 2007/0241482 A1 | 10/2007 | Giller et al. |
| 2007/0298182 A1* | 12/2007 | Perret .................... B22F 10/70 |
| | | 427/427.3 |
| 2008/0001331 A1 | 1/2008 | Ederer |
| 2008/0003390 A1 | 1/2008 | Hayashi |
| 2008/0018018 A1 | 1/2008 | Nielsen et al. |
| 2008/0047628 A1 | 2/2008 | Davidson et al. |
| 2008/0069994 A1 | 3/2008 | Kanda |
| 2008/0138515 A1 | 6/2008 | Williams |
| 2008/0187711 A1 | 8/2008 | Alam et al. |
| 2008/0233302 A1 | 9/2008 | Elsner et al. |
| 2008/0241404 A1 | 10/2008 | Allaman et al. |
| 2008/0260945 A1 | 10/2008 | Ederer et al. |
| 2008/0299321 A1 | 12/2008 | Ishihara |
| 2009/0068376 A1 | 3/2009 | Philippi et al. |
| 2009/0152771 A1* | 6/2009 | Philippi ................ B33Y 10/00 |
| | | 264/410 |
| 2009/0283501 A1 | 11/2009 | Erikson et al. |
| 2010/0007048 A1 | 1/2010 | Schweininger |
| 2010/0007062 A1 | 1/2010 | Larsson et al. |
| 2010/0206743 A1 | 2/2010 | Van Thillo et al. |
| 2010/0152865 A1 | 6/2010 | Jonsson et al. |
| 2010/0212584 A1* | 8/2010 | Ederer .................... B05C 19/04 |
| | | 118/56 |
| 2010/0207288 A1 | 9/2010 | Enrico |
| 2010/0244301 A1 | 9/2010 | Ederer et al. |
| 2010/0247742 A1 | 9/2010 | Shi et al. |
| 2010/0272519 A1 | 10/2010 | Ederer et al. |
| 2010/0279007 A1 | 11/2010 | Briselden et al. |
| 2010/0291314 A1 | 11/2010 | Kahani-Shirazi |
| 2010/0323301 A1 | 12/2010 | Tang et al. |

(56) References Cited

U.S. PATENT DOCUMENTS

| | | | |
|---|---|---|---|
| 2011/0049739 A1 | 3/2011 | Uckelmann et al. | |
| 2011/0059247 A1 | 3/2011 | Kuzusako et al. | |
| 2011/0133367 A1* | 6/2011 | Weidinger | B33Y 40/00 264/497 |
| 2011/0177188 A1 | 7/2011 | Bredt et al. | |
| 2011/0223437 A1 | 9/2011 | Ederer et al. | |
| 2011/0293771 A1* | 12/2011 | Oberhofer | B29C 64/165 425/182 |
| 2012/0046779 A1 | 2/2012 | Pax et al. | |
| 2012/0097258 A1 | 4/2012 | Hartmann et al. | |
| 2012/0113439 A1 | 5/2012 | Ederer et al. | |
| 2012/0126457 A1 | 5/2012 | Abe et al. | |
| 2012/0189102 A1 | 7/2012 | Maurer, Jr. et al. | |
| 2012/0291701 A1 | 11/2012 | Grasegger et al. | |
| 2012/0329943 A1 | 12/2012 | Hicks et al. | |
| 2013/0000549 A1 | 1/2013 | Hartmann et al. | |
| 2013/0004610 A1 | 1/2013 | Hartmann et al. | |
| 2013/0026680 A1 | 1/2013 | Ederer et al. | |
| 2013/0029001 A1 | 1/2013 | Gunther et al. | |
| 2013/0157193 A1 | 6/2013 | Moritani et al. | |
| 2013/0189434 A1 | 7/2013 | Randall et al. | |
| 2013/0199444 A1 | 8/2013 | Hartmann | |
| 2013/0234355 A1 | 9/2013 | Hartmann et al. | |
| 2013/0302575 A1 | 11/2013 | Mogele et al. | |
| 2014/0048980 A1* | 2/2014 | Crump | B29C 64/25 264/401 |
| 2014/0065194 A1 | 3/2014 | Yoo | |
| 2014/0212677 A1 | 7/2014 | Gnuchtel et al. | |
| 2014/0227123 A1 | 8/2014 | Gunster | |
| 2014/0236339 A1 | 8/2014 | Fagan | |
| 2014/0271961 A1 | 9/2014 | Khoshnevis | |
| 2014/0306379 A1 | 10/2014 | Hartmann et al. | |
| 2015/0042018 A1 | 2/2015 | Gunther et al. | |
| 2015/0110910 A1 | 4/2015 | Hartmann et al. | |
| 2015/0224718 A1 | 8/2015 | Ederer et al. | |
| 2015/0266238 A1 | 9/2015 | Ederer et al. | |
| 2015/0273572 A1* | 10/2015 | Ederer | B29C 64/171 164/15 |
| 2015/0290881 A1 | 10/2015 | Ederer et al. | |
| 2015/0375419 A1 | 12/2015 | Gunther et al. | |
| 2016/0318251 A1 | 3/2016 | Ederer et al. | |
| 2016/0263828 A1 | 9/2016 | Ederer et al. | |
| 2016/0303762 A1 | 10/2016 | Gunther | |
| 2016/0311167 A1 | 10/2016 | Gunther et al. | |
| 2016/0311210 A1 | 10/2016 | Gunther et al. | |
| 2017/0050378 A1 | 2/2017 | Ederer | |
| 2017/0106595 A1 | 4/2017 | Gunther et al. | |
| 2017/0151727 A1 | 6/2017 | Ederer et al. | |
| 2017/0157852 A1 | 6/2017 | Ederer et al. | |
| 2017/0182711 A1 | 6/2017 | Gunther et al. | |
| 2017/0210037 A1 | 7/2017 | Ederer et al. | |
| 2017/0297263 A1 | 10/2017 | Ederer et al. | |
| 2017/0305139 A1 | 10/2017 | Hartmann | |
| 2017/0355137 A1 | 12/2017 | Ederer et al. | |
| 2018/0079133 A1 | 3/2018 | Ederer et al. | |
| 2018/0141271 A1 | 5/2018 | Gunter et al. | |
| 2018/0326662 A1 | 11/2018 | Gunther et al. | |
| 2018/0339452 A1 | 11/2018 | Heymel et al. | |
| 2018/0369910 A1 | 12/2018 | Gunter et al. | |
| 2019/0047218 A1 | 2/2019 | Ederer et al. | |
| 2019/0084229 A1 | 3/2019 | Gunther | |

FOREIGN PATENT DOCUMENTS

| | | |
|---|---|---|
| DE | 3221357 A1 | 12/1983 |
| DE | 3930750 C2 | 3/1991 |
| DE | 4102260 A1 | 7/1992 |
| DE | 4305201 C1 | 4/1994 |
| DE | 4 325 573 A1 | 2/1995 |
| DE | 29506204 U1 | 6/1995 |
| DE | 4440397 | 9/1995 |
| DE | 19525307 A1 | 1/1997 |
| DE | 19530295 C1 | 1/1997 |
| DE | 19528215 A1 | 2/1997 |
| DE | 29701279 U1 | 5/1997 |
| DE | 19545167 A1 | 6/1997 |
| DE | 69031808 T2 | 4/1998 |
| DE | 19853834 | 5/2000 |
| DE | 69634921 T2 | 12/2005 |
| DE | 201 22 639 U1 | 11/2006 |
| DE | 10 2006 040 305 A1 | 3/2007 |
| DE | 102006029298 A1 | 12/2007 |
| DE | 102007040755 A1 | 3/2009 |
| DE | 102007047326 A1 | 4/2009 |
| DE | 102009036153 A1 | 2/2011 |
| DE | 102010015451 A1 | 10/2011 |
| DE | 102011053205 A1 | 3/2013 |
| DE | 102011119338 A1 | 5/2013 |
| EP | 0361847 B1 | 4/1990 |
| EP | 1415792 | 5/2004 |
| EP | 1457590 A | 9/2004 |
| GB | 2297516 A | 8/1996 |
| JP | S62275734 A | 11/1987 |
| JP | 2003/136605 A | 5/2003 |
| JP | 2004/082206 A | 3/2004 |
| JP | 2009/202451 A | 9/2009 |
| WO | 90/03893 A1 | 4/1990 |
| WO | 01/40866 A2 | 6/2001 |
| WO | 2004/014637 A1 | 2/2004 |
| WO | 2006/100166 A1 | 9/2006 |
| WO | 2008/049384 A1 | 5/2008 |
| WO | 2008/061520 A2 | 5/2008 |
| WO | 2011/063786 A1 | 6/2011 |
| WO | 2012/076205 A1 | 6/2012 |
| WO | 2013/075696 A1 | 5/2013 |
| WO | 2014/090207 A1 | 6/2014 |
| WO | 2014/166469 A1 | 10/2014 |
| WO | 2016/019942 A1 | 2/2016 |
| WO | 2017/008777 A1 | 1/2017 |

OTHER PUBLICATIONS

International Search Report and Written Opinion, PCT Application No. PCT/DE2016/000343, dated Dec. 21, 2016.

Marcus et al., Solid Freedom Fabrication Proceedings, Nov. 1993.

Cima et al., "Computer-derived Microstructures by 3D Printing: Bio- and Structural Materials," SFF Symposium, Austin, TX, 1994.

Marcus, et al., Solid Freeform Fabrication Proceedings, Sep. 1995, pp. 130-133.

Gebhart, Rapid Prototyping, pp. 118-119, 1996.

Feature Article—Rapid Tooling—Cast Resin and Sprayed Metal Tooling by Joel Segal, Apr. 2000.

EOS Operating Manual for Laser Sintering Machine with Brief Summary Feb. 22, 2005.

Sachs, E., P. Williams, D. Brancazio, M. Cima, and K. Kremmin, Three dimensional printing: Rapid Tooling and Prototypes Directly from a CAD Model. In Proceedings of Manufacturing International 1990 (Atlanta, GA, Mar. 25-28). ASME, New York, 1990, pp. 131-136.

Sachs et al., "Three-Dimensional Printing: Rapid Tooling and Prototypes Directly from a CAD Model", Massachusetts Institute of Technology, pp. 143-151, Jan. 1990.

Williams, "Feasibility Study of Investment Casting Pattern Design by Means of Three Dimensional Printing", Department of Mechanical Engineering, abstract only; Sep. 25, 2001.

Armin Scharf, "Erster 3D-Endlosdrucker", zwomp.de, http://www.zwomp.de/2012/11/06/voxeljet-endlosdrucker/ dated Nov. 6, 2012.

Screen shots of URL: http://www.youtube.com/watch?v=hgIrNXZjIxU taken in approximately 5 second intervals on Nov. 12, 2015.

Jacobs et al., 2005 SME Technical Paper, title "Are QuickCast Patterns Suitable for Limited Production?".

* cited by examiner

DEVICE AND METHOD FOR PRODUCING THREE-DIMENSIONAL SHAPED PARTS

CLAIM OF PRIORITY

This application is a national phase filing under 35 USC § 371 from PCT Application serial number PCT/DE2016/000343 filed on Sep. 13, 2016 and claims priority therefrom. This application further claims priority from German Patent Application DE 10 2015 011 790.4 filed on Sep. 16, 2015. PCT/DE2016/000343 and DE 10 2015 011 790.4 are each incorporated by reference in its entirety.

The invention relates to a device and a method for producing three-dimensional molded parts by a layer construction method on a construction field in a construction space of a device, wherein materials are fed to and removed from the construction space.

European Patent EP 0 431 924 B1 describes a process for producing three-dimensional objects based on computer data. In the process, a thin layer of particulate material is deposited on a platform by means of a coater (recoater) and has a binder material selectively printed thereon by means of a print head. The particulate region with the binder printed thereon bonds and solidifies under the influence of the binder and, optionally, an additional hardener. Next, the construction platform is lowered by one layer thickness or the coater/print head unit is raised and a new layer of particulate material is applied, the latter also being printed on selectively as described above. These steps are repeated until the desired height of the object is achieved. Thus, the printed and solidified regions form a three-dimensional object (molded part).

Upon completion, the object made of solidified particulate material is embedded in loose particulate material, from which it is subsequently freed. For this purpose a suction device may be used, for example. This leaves the desired objects which then have to be freed from any powder adhering to them, e.g. by brushing them off manually.

3D printing on the basis of pulverulent materials and the introduction of liquids using a print head is the quickest method among the layer construction techniques.

This method allows the processing of different fluids, such as particulate materials, for example, which includes—as a non-exhaustive example—natural biological raw materials, polymeric plastic materials, metals, ceramics and sands.

Other powder-based rapid prototyping processes, e.g. selective laser sintering or electron beam sintering, work in a similar manner, also applying loose particulate material layer by layer and selectively solidifying it using a controlled physical source of radiation.

Moreover, there are further methods, such as e.g. Fused Deposition Modeling (FDM) layer construction methods, wherein the cross-sections of each part are constructed using a liquid medium which solidifies outside a nozzle, changing the position of the construction platform by one layer thickness with respect to the previous position, and repeating these steps until the part is finished.

In the following, all these processes will be summarized by the term "layer construction method", "three-dimensional printing method" or "3D printing method".

Methods of the type described in this disclosure may comprise, for example, the Fused Deposition Modeling technique, stereolithography, laser sintering or laser melting, multijet or polyjet modeling, high-speed sintering or multijet fusion methods as well as binder jetting (FIG. 1 and FIG. 2).

Many prior art methods and devices use construction containers (104) or construction platforms (102), onto which construction material is applied during a construction process, for example by means of a powder coater (101) and a print head (100), and which carry at least the desired parts (103) upon completion of the construction process. In addition, there may also be a certain amount of unused construction material remaining in the construction container (104) or on the construction platform. In many cases, these construction containers (104) may be removed from the production machine (300) and exchanged. This allows a high degree of machine utilization.

The construction containers (104) and/or platforms (102) can be pulled out of the machine or moved out automatically in a certain direction. This is usually done manually in a horizontal direction. Outside the construction field, in some devices, they are picked up by a handling device and, if necessary, fed to further processing devices. The latter may be, for example, a lift truck by which the container is transported to another station. Such design requires plenty of space in front of the production machine (300).

The construction material is also fed to the machine via containers. These containers may be, for example, silos in the case of powders, or canisters in the case of liquids. Fused Deposition Modeling often involves inserting a roll of construction material into the machine.

What all of the prior art methods have in common is the fact that the starting material is handled by completely different mechanisms than the construction container (104). The movement directions of the respective handling operations are usually perpendicular to one another and are performed from different sides of the device. In Fused Deposition Modeling, e.g. in large systems, the construction platform is removed from the front using a cart. However, the construction material is fed to the machine manually, as a role, from the side.

In binder jetting (FIG. 2), the material is often stored in a silo (200) and fed to the production machine (300) via screw conveyors (201). The binder is introduced by manual insertion of canisters (202) filled with binder, and the construction container (104) may be prepared, for example, via rails or simply via a transport cart (204). In the process, the spatial directions of all movements cross. In many cases, movements in several or all spatial directions are possible in individual operations. This generates a large number of possible movements and collisions, which accounts for the complexity of the device.

Therefore, it was an object of the present invention to provide a device and a method requiring only a minimum of space for charging and discharging operations. Another object of the present invention was to provide a device and a method allowing the prior art disadvantages to be avoided.

BRIEF SUMMARY OF THE DISCLOSURE

In one aspect, the disclosure relates to a method for producing three-dimensional molded parts by a layer construction method on a construction field in a construction space of a device, wherein materials are fed to and removed from the construction space and wherein the feeding and removal of all materials is effected in one spatial direction of the device.

In another aspect, the disclosure also relates to a device for producing three-dimensional molded parts by a layer construction method on a construction field in a construction space, wherein materials are fed to and removed from the construction field and wherein all supply devices are provided on the device such that feeding and removal of the materials can be effected from one spatial direction.

DETAILED DESCRIPTION

Figure 1:
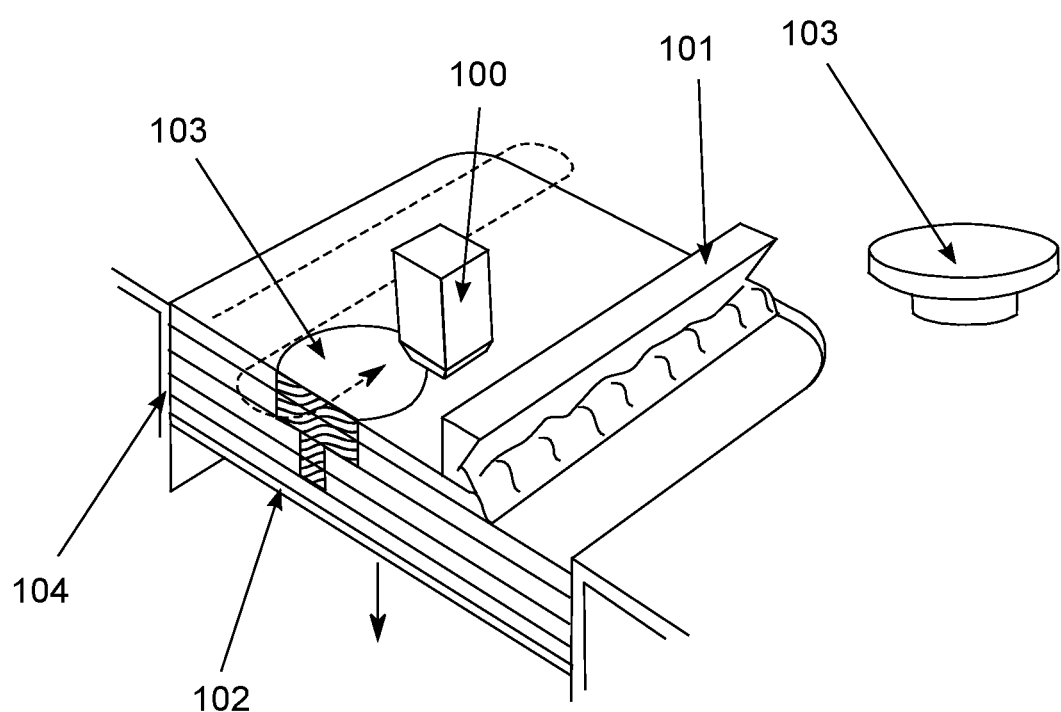
FIG. 1: Schematic representation of a prior art binder jetting method for producing three-dimensional molded parts.

In the following, several terms will be defined more precisely. Otherwise, the terms used shall have the meanings known to the person skilled in the art.

In the sense of the invention, "layer construction methods" or "3D printing methods", respectively, are all methods known from the prior art which enable the construction of components in three-dimensional molds and are compatible with the described process components and devices.

A "molded article" or "component" in the sense of the invention means all three-dimensional objects manufactured by means of the method according to the invention or/and the device according to the invention which exhibit dimensional stability.

"Materials" in the sense of the invention are all materials that can be supplied to and removed from the device. They include, in particular, construction materials, parts, molded articles, machine parts, excess material, maintenance parts, adjusting means, etc.

The "device" or "production machine" used for carrying out the method according to the invention may be any known 3D-printing device for layer construction which includes the required parts. Common components include coater, construction field, means for moving the construction field or other components, a metering device and heating means and other components which are known to the person skilled in the art and will therefore not be described in detail herein.

As "fluids", all flowable materials known for 3D printing may be used, in particular in the form of a powder, slag or liquid. These may include, for example, sands, ceramic powders, glass powders and other powders of inorganic materials, metal powders, plastic materials, wood particles, fiber materials, celluloses or/and lactose powders, as well as other types of organic, pulverulent materials. The particulate material is preferably a free-flowing powder when dry, but a cohesive, cut-resistant powder may also be used. This cohesivity may also result from adding a binder material or an auxiliary material.

A "construction field" is the plane or, in a broader sense, the geometric location on or in which the particulate material bed grows during the construction process by repeated coating with particulate material. The construction field is frequently bounded by a bottom, i.e. the construction platform, by walls and an open top surface, i.e. the construction plane.

The "construction platform" serves as the basis for the layer construction method. On the construction platform, the construction job is built up which contains the parts that are the target of the production. In many production methods, said construction platform can be removed from the machine.

In some methods, a "construction container" is provided in addition to the construction platform. For example, in binder jetting, there is powder in the construction container after completion of the production run, said powder containing the desired parts. In many devices, the construction container can be removed from the production machine.

A "construction space" according to the present invention is understood to be the entire area of the device in which the layer construction process takes place.

The "print head" consists of various components. These include the print modules which are aligned with respect to the print head. The print head is aligned with respect to the machine. This allows the position of a nozzle to be assigned to the machine coordinate system.

"Coater" or "recoater" means the unit by means of which the fluid is applied into or onto the construction field. The unit may consist of a fluid reservoir and a fluid application unit wherein, according to the present invention, the fluid application unit comprises a fluid outlet and a coating blade. The coater (101) may have an elongated reservoir that moves over the construction field, such as illustrated in FIG. 1. The reservoir of the coater may have an elongated-funnel shape, such as illustrated in FIG. 1.

A "spatial direction" in the sense of the present invention is understood to be an imaginary axis occupying a certain angle with respect to the coordinate system of the production machine. In the sense of this invention, it is the spatial direction in which materials are moved in the area of stations. According to the invention, there is, for example, only one sense of direction in the area of the production machine. For instance, a handling system may be installed above the production machine. Consequently, all movements in the area of the production machine must be either upward or downward movements. It is only from a certain height, depending on the height of the production machine and the material or the container, respectively, that a second movement direction can be allowed. With respect to the geometrical parameters of the production machine, the movement direction should extend at least approximately perpendicular to the edges of the production machine.

A "construction direction" in the sense of the invention is the direction in which the parts grow, i.e. gain height in many cases, during the layer construction process.

According to the present invention, an "interface" is understood to mean an interface to a device according to the invention. This may be, for example, the interface between the supply system and the materials, such as e.g. containers or tools. The interface may be mechanical, electrical and defined for fluid media (e.g. compressed air). It should be the same for all materials, containers and tools. At least, all elements should fit together, even though not all elements use all functions of the interface.

The term "further processing station" may be understood to mean a production machine or any station, including a material receiving station.

According to the present invention, a "supply system" is understood to be a system for supplying the production machine with consumable materials in one spatial direction, removing waste materials, and removing the produced articles from the production area. Preferably, the supply system also comprises a handling system for containers. These containers preferably comprise an interface whose counterpart is attached to the supply system. The containers can be moved to different positions. Certain positions perform a function and are called stations in this description.

A "tool" in the sense of this invention is a device which can be connected to the supply system and which can perform a task actively, i.e. using energy and information.

A station is presently understood to be a position of the supply system that performs a function. For example, one position is a construction container-preparing position within the production machine. The new-material supply station may also serve as an example of a station.

According to the present description, a "container" is an object of any shape which implements the interface and can receive materials. An example may be a container which contains sand particle material. Such a container may have inclined surfaces and, as the case may be, also include a second interface, e.g. to the reservoir in the production machine. The opening of the container may preferably be actuated via the supply system.

A "binder jetting layer construction method" means that powder is applied in layers onto a construction platform, a liquid binder is printed on the cross-sections of the part on this powder layer, the position of the construction platform is changed by one layer thickness with respect to the previous position, and these steps are repeated until the part is finished.

On the other hand, in "Fused Deposition Modeling (FDM) layer construction methods" the cross-sections of the part are constructed by a liquid medium which solidifies outside a nozzle, changing the position of the construction platform by one layer thickness with respect to the previous position, and repeating these steps until the part is finished.

A "laser sintering layer construction method" means that powder is applied in layers onto a construction platform, the cross-sections of the part are melted by a laser beam on this powder layer and solidified by cooling, the position of the construction platform is changed by one layer thickness with respect to the previous position, and these steps are repeated until the part is finished.

In "stereolithography layer construction methods", the cross-sections of the part are each solidified by chemical reaction using a laser beam in a container filled with a liquid. The position of the construction platform is changed by one layer thickness with respect to the previous position, and these steps are repeated until the part is finished.

Various aspects of the invention will be described below.

One aspect of the invention relates to a method for producing three-dimensional molded parts by a layer construction method on a construction field in a construction space of a device, wherein materials are fed to and removed from the construction space. In this case, feeding and removal of all materials is done in one spatial direction of the device.

The fact that all materials are now fed to the device and removed from the device in one spatial direction reduces the required space around the device considerably, because additional space for removing/feeding, maneuvering etc. needs to be provided only in one spatial direction.

Due to the access from only one respective spatial direction of the device, other spatial directions remain available, e.g. for maintenance purposes.

According to a preferred embodiment of the present invention, the spatial direction is provided in the direction of a build-up direction. For a vertical build direction (the layers are built up vertically on top of each other), this means that this space should be provided in the vertical direction above the device. Thus, the device does not require any additional space around the device in the horizontal direction, so that the device can be integrated, for example into a system, in a very space-saving manner.

For instance, if a supply means is installed above several production machines arranged in series, the production machines are easily accessible from two sides. This allows good separation of the safety zone around the production machines, while achieving a high spatial density of the production machines. Charging and discharging from only one spatial direction alleviates the problem of controlling such a device. The productive system can be constructed in a modular way according to the invention and allows different degrees of automation with respect to the production machines. In this context, the production machines themselves are preferably prepared for such a system, but they need not be operated jointly.

Preferably, the feeding and removal of the materials is effected via an interface on the device.

Providing an interface facilitates the attachment of the materials or of the containers, platforms or the like receiving the materials. Automation is also simplified considerably by providing an interface.

This can be simplified even further, if one or more handling devices for feeding and removing the materials can be made to engage with the device.

Such a handling device may preferably feed materials from the device to other processing stations. This can improve the automation of a method according to the invention still further.

In this context, it is quite conceivable that several devices and/or processing stations are operated jointly, with one supply system charging several devices and/or processing stations.

The feeding and removal of the plurality of devices may be implemented in a linear or circular arrangement in this case.

In another aspect, the invention relates to a device for producing three-dimensional molded parts on a construction field in a construction space, wherein materials are fed to and removed from the construction field. In this case, all supply means of the device are provided on the device in a manner allowing the materials to be fed and removed in one spatial direction.

Such a device can be employed in a very space-saving manner.

This applies, in particular, if the spatial direction for the device is provided in a direction of construction, above the direction of construction.

Even better handling is achieved by providing the device, in the spatial direction, with one or more defined interfaces for receiving the supply means.

If the device is configured such, in this case, that a construction platform and/or a construction container are provided in the device and can be fed and removed via the interface, the feeding and removal of the materials will be even easier to perform.

If a handling device is further provided that can be made to engage with the device, thereby allowing materials or containers and platforms, respectively, to be fed and/or removed, the feeding and removal can be effected automatically as well.

Providing several devices to be jointly operated and a supply system that charges several devices will allow a multiplicity of automated production processes to be carried out.

Depending on the production method and the available space, it may be advantageous to arrange the devices such that the materials can be fed and removed in a linear arrangement or in a circular arrangement.

In a still further aspect, the invention relates to the use of the above-described device in Fused Deposition Modeling processes, stereolithography, laser sintering, laser melting, multijet or polyjet modeling, high-speed sintering, multijet fusion processes and/or binder jetting.

The present invention will be explained in more detail below, with reference to examples representing preferred embodiments.

Figure 3:
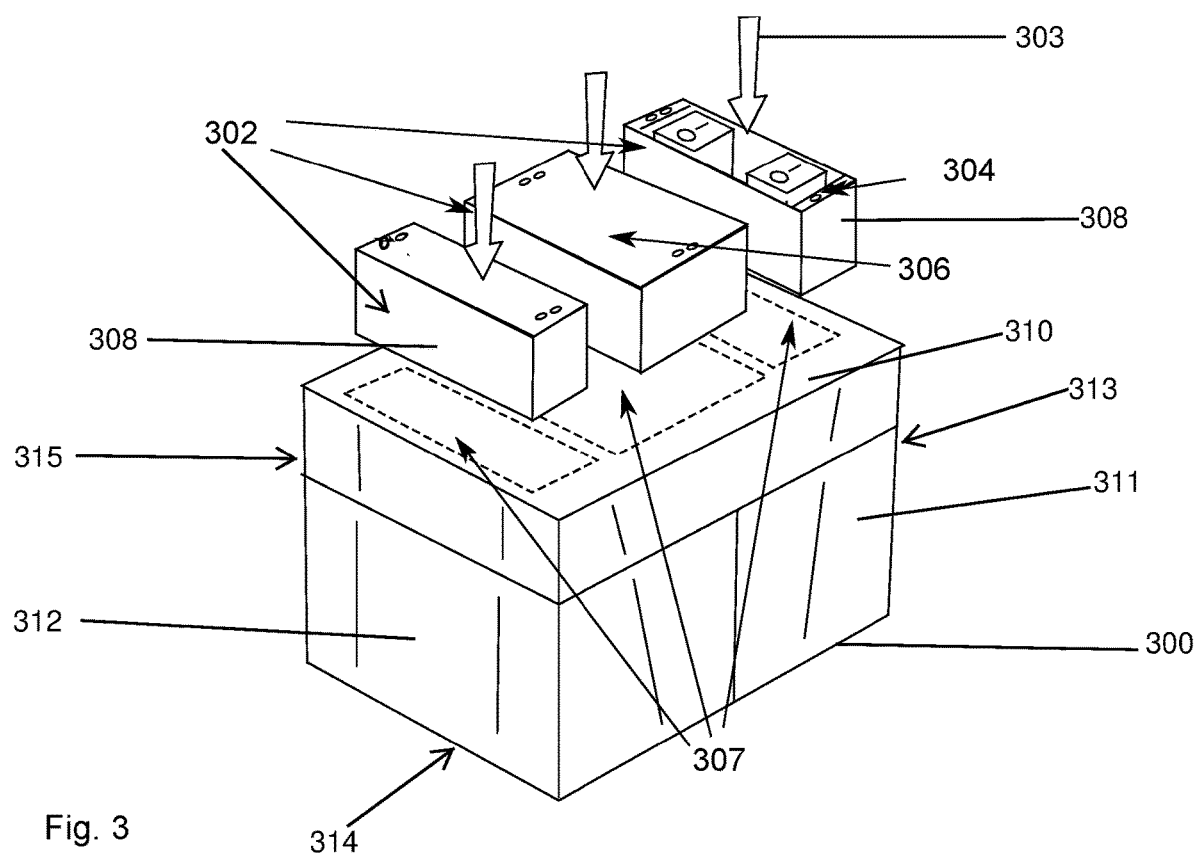
FIG. 3: Schematic representation of a device according to a preferred embodiment of the present invention.

FIG. 3 illustrates a preferred embodiment of the present invention. It shows a device which is designed to produce three-dimensional parts and can carry out a corresponding method.

In this device or production machine (300), respectively, it can be seen that, according to the invention, all materials, such as e.g. consumable materials, including the parts produced by this production machine (300), can be fed or removed, respectively, in one spatial direction (303). In other words, different consumable materials are provided to the production machine from the same side of the production machine, such as illustrated in FIG. 3. For this purpose, according to the embodiment shown, containers (302) are used as parts comprising a defined interface (304) for a receptacle. Moreover, a supply means can be used which carries a counterpiece that can be locked with the receptacle, thereby allowing it to remove the containers (302) from the area of the production machine (300), deposit them in other devices and also handle containers (302) from several production machines (300). The production machine (300) may be configured for receiving a construction container (306), such as illustrated in FIG. 3. The production machine may be configured for receiving one or more construction material containers, such as illustrated in FIG. 3.

Figure 2:
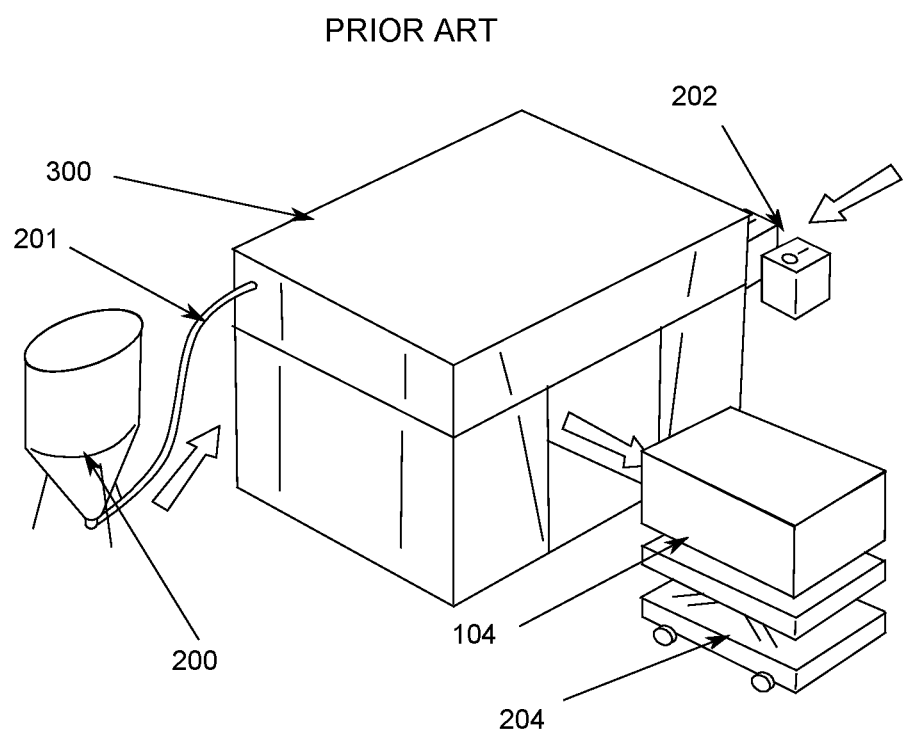
FIG. 2: Schematic representation according to the prior art of a material feed and of removal of the produced molded part in a binder jetting method.

Platform-based layer construction methods are particularly suitable in the application of this invention. For example, the method according to the invention can be applied in the Fused Deposition Modeling technique, in stereolithography, in laser sintering or laser melting, in multijet or polyjet modeling, in high-speed sintering or the multijet fusion method as well as in binder jetting (FIG. 1 and FIG. 2; cf. also the above description of the prior art). The production machine may include a powder coater (101), such as illustrated in FIG. 1. The production machine may include a print head (100) such as illustrated in FIG. 1. The layer construction method may employ a construction platform (102), such as illustrated in FIG. 1. The layer construction method may employ a construction container (104), such as illustrated in FIG. 1.

For instance, a production machine (300) according to a preferred embodiment of the invention may be supplied from above, in the direction of the arrow (303), for the binder jetting method. Both the construction container (306) and the construction material containers (308), as well as spent powder material (in a container like (302)) can be fed to and removed from the machine from above. The consumable materials can be re-filled during operation of a machine.

In the embodiment shown, all device parts which transport materials are provided with a uniform interface (304). Said interface (304) may optionally be implemented by intermediate tools, too.

Figure 4:
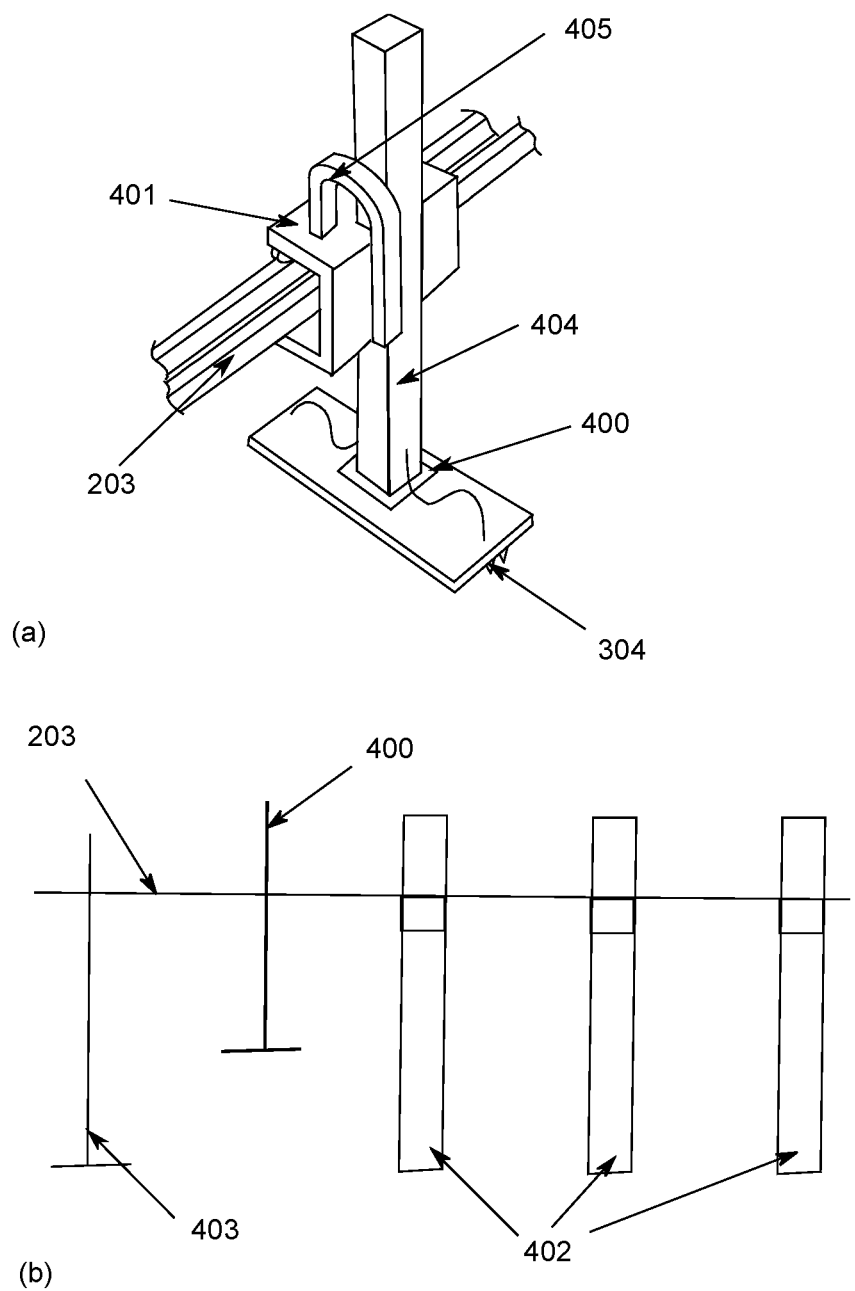
FIG. 4: Schematic representation of a possible embodiment of a supply means for a device according to a further preferred embodiment of the present invention.

FIGS. 4a) and 4b) show that the interface (304) can be contacted by a handling device (400), thereby fixing the respective container (302, including the construction container (306)) to the handling device (400). The handling device (400) then performs movements in at least two spatial directions. The first movement serves to remove the container from the area of the production machine (300) or other equipment associated with the production process. The second movement serves the purpose of positioning relative to various positions.

The supply means is basically a rail system (203) on which a beam hoist (401) can be moved in the longitudinal direction of the supply means. The rail system may be connected, for example, to the column system (402) of a machine hall. Also, subsequently mountable feet (403) may carry the rail system.

The beam hoist has a linear module (404) mounted thereon, allowing the interface (304) of the supply system to be moved up and down. As a simplified variant, a crane rope with hooks can be used, too.

Figure 5:
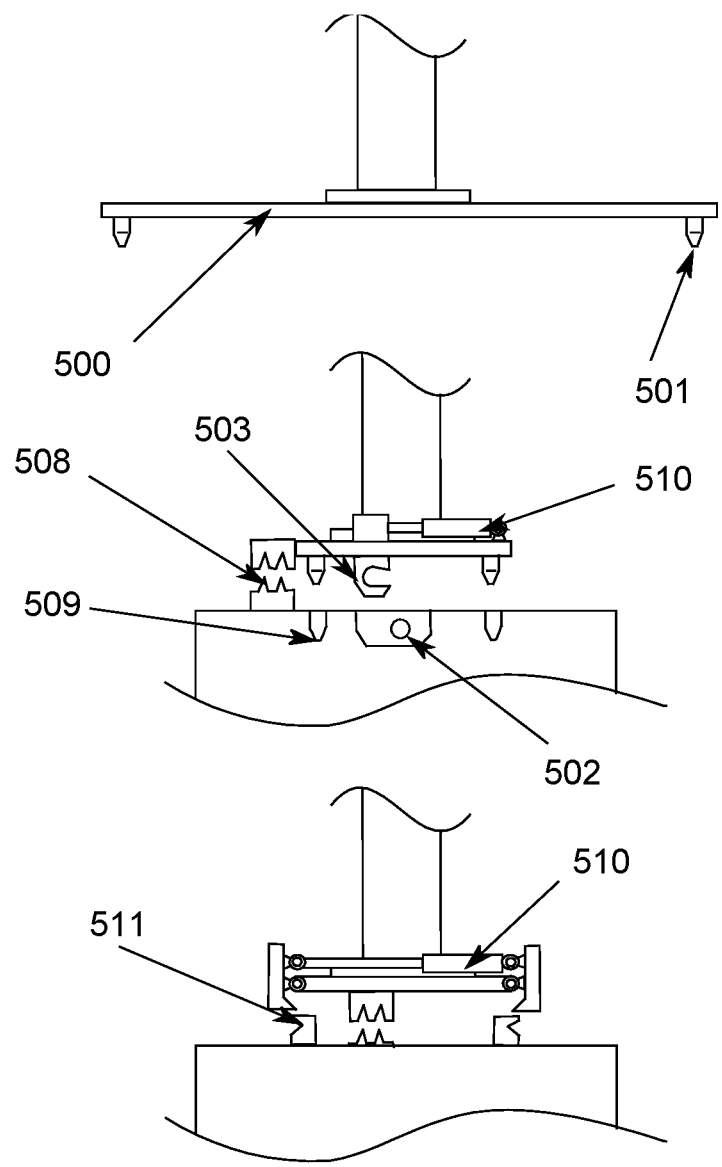
FIG. 5: Schematic representation of an interface of a supply means to the device according to a particularly preferred embodiment of the invention.

FIG. 5 shows an interface (304, 500) according to a preferred embodiment in more detail. The interface (500) is mounted, for example, to the lower end of the linear module. For example, the interface (500) may be opened or closed pneumatically. The type of connecting tool (501) may comprise bolts (502) and hooks (503) or pawls (511). In addition, the interface may be provided with devices protecting it against soiling. Cleaning devices for the counter receptacle are also useful. In this case, for example, a switchable compressed air jet can be employed.

Figure 6:
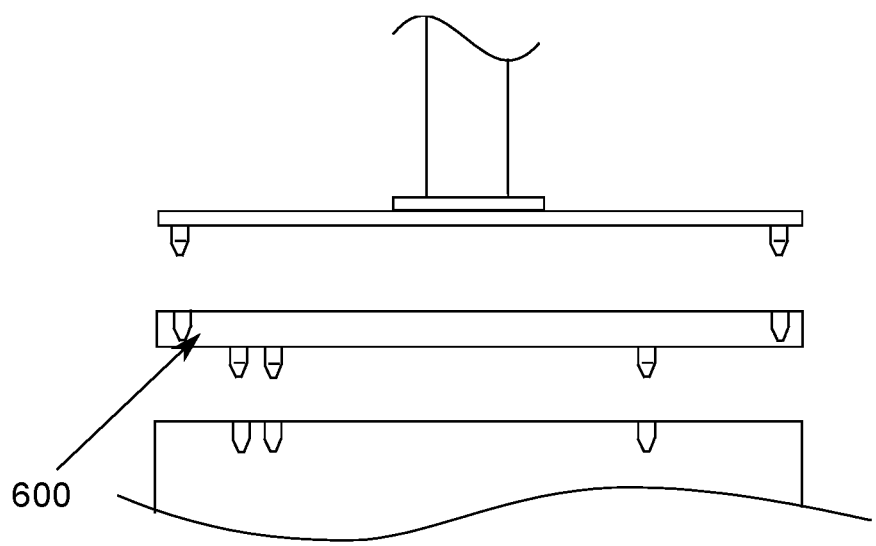
FIG. 6: Schematic representation of creating an interface in the case of interfaces according to an exemplary embodiment which differ from the system.

The supply means is mounted above the machine, for example. In this case, all containers and tools to be conveyed are preferably arranged in a row. If the gripper points of the interface are eccentric or have a differing "drilling pattern", an intermediate tool (600) according to FIG. 6 will be used.

Figure 8:
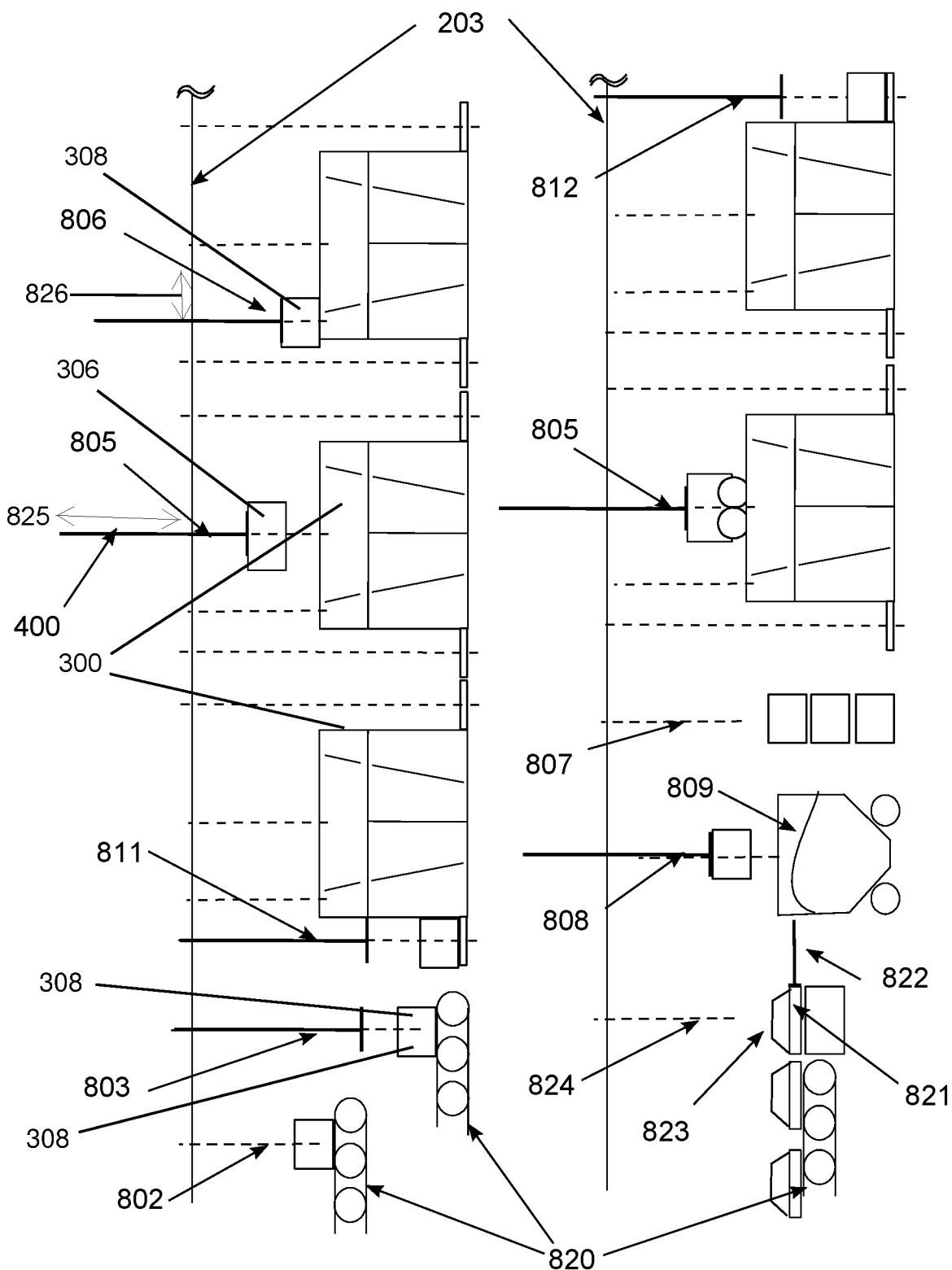
FIG. 8: Schematic representation of a system for carrying out a preferred method according to the invention.

Several stations of supply means as well as discharging and charging stations of the device (300) are shown in FIG. 8. Such positions include, for example, the charging position of the construction container (805) into the machine (300), positions for charging operating resources into the machine (806, 812), corresponding positions in a combination of machines, positions of other system parts, such as an unpacking station (824), new material-charging stations (806) or tool stations (807).

As is evident from FIG. 8, a device according to the preferred embodiment shown therein is particularly suitable for operating machines in combination. In this case, a supply system is able to charge several machines. Material feeding and removal can be performed in a linear arrangement, but a circular arrangement is also possible.

For example, a receiving station for consumable material (802, 803) can be provided on the left side (at the top in FIG. 8) of such a device. This is where the respectively matching containers pass on a conveyor belt (820) into the access area of the supply means. The different materials can be provided via conveyor belts of different heights.

Figure 7:
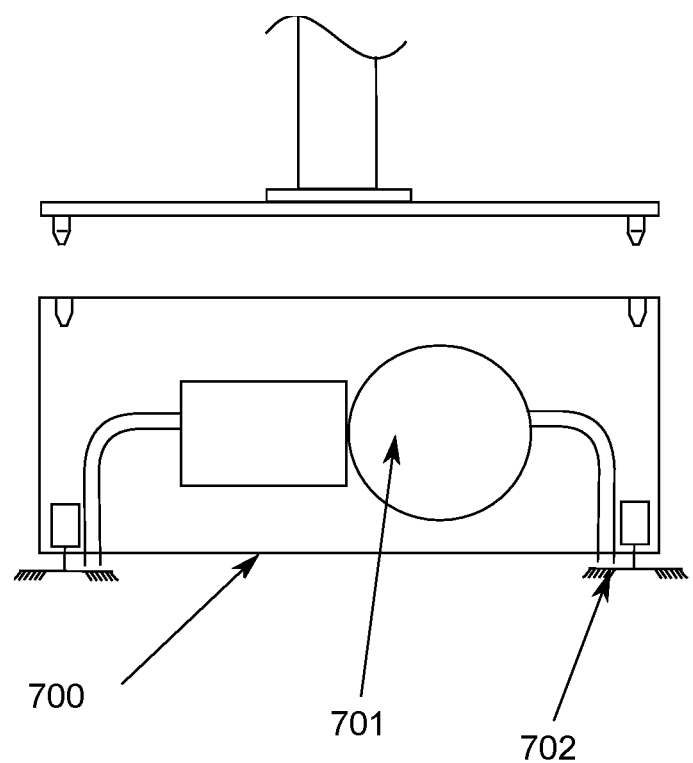
FIG. 7: Schematic representation of a tool for picking up a supply means according to another embodiment of the invention.

Further stations can be arranged next to the receiving station for containers. A tool station (807) may carry various devices that are not assignable to the containers or construction containers as parts. One example would be automatic cleaning means for the construction field (700) comprising a suction device (701) and brushes (702) in the production machine (300), as shown in more detail in FIG. 7.

One area may comprise means for disposal (808). In powder-based processes, used particulate material may be generated. A waste container (809) could be provided here. The respective collection container of the production machine will be emptied here by opening a flap. The supply means provides the required energy and the signal via a plug-in connection (508).

An area for disposal of liquid waste may be designed in a similar manner. However, it is also possible to simply place the container here and perform adequate disposal manually in the case of critical chemicals.

Another area could be a transfer point (824) for produced parts. There are different configurations conceivable for this. The parts can be removed from the construction container fully automatically as a block. For this purpose, a movable receiving platform (821) may be present in the construction container or on the construction platform. The platform (821) may be removed from the construction container by simple manipulators (822). Next, the construction container may be cleaned, for example, by a tool. After the procedure, the container is conveyed to a container warehouse or into a production machine by the supply means.

In order to increase the response time of the supply means, several beam hoists with linear modules may be employed. The control unit must then ensure useful coordination of the units.

LIST OF REFERENCE NUMERALS

100 print head
101 powder coater
102 construction platform
103 produced part
104 construction container
200 silo
201 screw conveyors
202 binder canister
203 rail system
204 transport cart
300 production machine
302 container (generic container)
303 spatial direction
304 interface
306 construction container
307 openings
308 construction material container
310 top side
311 first side
312 third side (e.g., generally orthogonal to the first side)
313 fourth side (e.g., opposing the third side)
314 bottom side
315 second side (e.g., opposing the first side)
400 handling device
401 beam hoist
402 column
403 pedestal
404 linear module
405 energy supply
500 interface
501 connecting tool
502 bolt
503 hook
504 friction-fit element
505 pawl
506 protection against soiling
507 cleaning device
508 additional function plug
509 guide bore
510 cylinder
511 pawl
600 adaptor plate
700 tool for cleaning the construction field of the production machine
701 suction device
703 brushes
802 receiving station for consumable material
803 receiving station for consumable material
805 transfer point for parts/tools
806 filling point for consumable powder material
807 tool station
808 disposal station
809 waste container
810 rail system
811 removal point for overfeed powder
812 filling point for consumable fluid material
820 conveyor belt
821 receiving platform
822 manipulator
823 unpacked powder cakes
824 unpacking position
825 first movement direction
826 second movement direction

What is claimed is:

1. A production machine for producing three-dimensional molded parts on a construction field in a construction space, wherein materials are fed to and removed from the construction field,
characterized in that
the production machine has a top side and an opposing bottom side, a first vertical side and an opposing second vertical side, a third vertical side and opposing fourth vertical side, wherein the first and third sides are generally orthogonal;
wherein the production machine is a machine for layered construction of the molded parts and includes a coater and a print head,
the production machine requires a construction container onto which material is applied during a construction process; and the production machine is prepared for receiving the construction container from one of the sides; and for receiving a supply of a consumable material including a powder, slag or liquid from the same side;
wherein the coater has an elongated reservoir that applies the consumable material over the construction field.

2. The production machine of claim 1, further characterized by the following:
the construction container is fed to and removed from the production machine by a handling device via one or more interfaces of the handling device.

3. The production machine of claim 1, wherein the one side is a top side of the production machine.

4. The production machine of claim 1, wherein one side is a front side, right side, back side, or left side of the production machine.

5. A production system including the production machine of claim 1, wherein the production system moves the construction container from the top of the production machine by lifting upward and moves it to an unpacking position, and provides a new construction container to the top of the production machine by lowering downward.

6. The production machine of claim 1, wherein the supply of the consumable material is provided in a construction material container.

7. The production machine of claim 1, wherein the production machine includes the construction container.

8. The production machine of claim 1, wherein the supply of consumable material includes a canister filled with a binder provided on the same side.

9. The production machine of claim 3, wherein
the construction container is fed to and removed from the production machine by a handling device via one or more interfaces of the handling device.

10. The production machine of claim 9, wherein
a handling device is further provided that can be made to engage with the production device, thereby allowing materials to be fed and/or removed.

11. A production system comprising several of the production machines of claim 10, wherein
which are jointly operated, and
a supply system which charges the several production devices.

12. The production system of claim 11, wherein the several production devices are arranged such that the materials can be fed and removed in a linear arrangement or in a circular arrangement.

13. The production machine of claim 1, wherein the consumable material includes a powder material and a liquid material, wherein the liquid material is provided in a container and the powder is provided in a different container, wherein the construction container, the container including the powder, and the container including the liquid are all provided to the production machine on the same side.

14. The production machine of claim 1, wherein the reservoir of the coater moves over the construction field and has an outlet.

15. A production system comprising:
a production machine for producing three-dimensional molded parts on a construction field in a construction space, wherein materials are fed to and removed from the construction field,
wherein the production machine has a top side and an opposing bottom side, a first vertical side and an opposing second vertical side, a third vertical side and an opposing fourth vertical side, wherein the first and third sides are generally orthogonal;
wherein the production machine is a machine for layered construction of the molded parts and includes a coater,
the production machine requires a construction container onto which material is applied during a construction process; and the production machine is prepared for receiving the construction container from one of the sides; and for receiving a supply of a consumable material including a powder, slag or liquid from the same side;
characterized in that the production system comprises a handling device for 1) removing a container including the consumable material from an area of the production machine and 2) positioning the container of consumable material, thereby allowing materials to be fed into the production machine and/or removed from the production machine;
wherein the system comprises several of the production machines which are jointly operated, and a supply system includes the handling device and which charges the several production devices with separate containers of the consumable material;
wherein the supply system includes a connecting tool which connects to one or more interfaces of a container of the consumable material.

16. The production system of claim 15, wherein the connecting tool includes bolts, hooks or pawls.

17. The production system of claim 16, wherein the supply system is mounted above the production machine.

18. The production system of claim 17, wherein the supply system includes a rail system on which a beam hoist moves in a longitudinal direction.

19. The production machine of claim 1, wherein the reservoir of the coater has an elongated funnel-shape.

20. The production system of claim 5, wherein the reservoir which is filled by a container including the consumable material, wherein the container including the consumable material has an inclined surface.

21. The production system of claim 20, wherein the container for the consumable material has an opening for filing the reservoir.

22. The production machine of claim 5, wherein the production system includes a conveyor belt.

* * * * *